(12) United States Patent
Bjäre et al.

(10) Patent No.: US 7,478,395 B2
(45) Date of Patent: Jan. 13, 2009

(54) MIDDLEWARE APPLICATION MESSAGE/EVENT MODEL

(75) Inventors: Björn Bjäre, Lund (SE); Jonas Hansson, Lund (SE); Chi Thu Le, Lund (SE); Lars Isberg, Malmö (SE)

(73) Assignee: Telefonaktiebolaget L M Ericsson (PUBL), Stockholm (SE)

( * ) Notice: Subject to any disclaimer, the term of this patent is extended or adjusted under 35 U.S.C. 154(b) by 730 days.

(21) Appl. No.: 10/666,699

(22) Filed: Sep. 19, 2003

(65) Prior Publication Data

US 2004/0127250 A1 Jul. 1, 2004

Related U.S. Application Data

(60) Provisional application No. 60/412,901, filed on Sep. 23, 2002, provisional application No. 60/412,902, filed on Sep. 23, 2002, provisional application No. 60/412,769, filed on Sep. 23, 2002, provisional application No. 60/412,756, filed on Sep. 23, 2002.

(51) Int. Cl.
*G06F 13/00* (2006.01)

(52) U.S. Cl. ......................... 719/311; 719/313; 719/328

(58) Field of Classification Search ................. 719/313, 719/314, 311, 328
See application file for complete search history.

(56) References Cited

U.S. PATENT DOCUMENTS

| | | | |
|---|---|---|---|
| 3,831,148 A | 8/1974 | Greenwald et al. |
| 5,689,565 A | 11/1997 | Spies et al. |
| 5,771,240 A | 6/1998 | Tobin et al. |
| 5,937,366 A | 8/1999 | Zbytniewski et al. |
| 6,002,869 A | 12/1999 | Hinckley |
| 6,044,408 A | 3/2000 | Engstrom et al. |
| 6,049,896 A | 4/2000 | Frank et al. |
| 6,052,524 A | 4/2000 | Pauna |
| 6,061,709 A | 5/2000 | Bronte |
| 6,105,154 A | 8/2000 | Wang et al. |

(Continued)

FOREIGN PATENT DOCUMENTS

EP 0902596 A2 3/1999

(Continued)

OTHER PUBLICATIONS

Manuel Rodriguez-Martinez et al., "Automatic Deployment of Application-Specific Metadata and Code in MOCHA", Lecture Notes in Computer Science, Mar. 31, 2000 (pp. 69-85).

(Continued)

*Primary Examiner*—Andy Ho
(74) *Attorney, Agent, or Firm*—MIchael Cameron

(57) ABSTRACT

System and method for transmitting messages between first and second software components such as application software and software of a platform for a product. An exemplary system includes a platform having a software component and an interface component having an interface for providing an application or a module in an application domain with access to the software component. The system further includes a message transmitting mechanism for transmitting messages between the application or the module and the platform via the interface that includes a message model for allowing an application to select either a callback mode or a full message mode for receiving messages between the application or the module and the platform, and a message handler for routing messaging according to the selected mode.

20 Claims, 5 Drawing Sheets

U.S. PATENT DOCUMENTS

| | | | |
|---|---|---|---|
| 6,112,312 A | | 8/2000 | Parker et al. |
| 6,125,398 A | * | 9/2000 | Mirashrafi et al. .......... 709/236 |
| 6,137,802 A | | 10/2000 | Jones et al. |
| 6,269,396 B1 | | 7/2001 | Shah et al. |
| 6,279,124 B1 | | 8/2001 | Brouwer et al. |
| 6,317,659 B1 | | 11/2001 | Lindsley et al. |
| 6,353,897 B1 | | 3/2002 | Nock et al. |
| 6,389,491 B1 | | 5/2002 | Jacobson et al. |
| 6,449,646 B1 | * | 9/2002 | Sikora et al. ................ 709/226 |
| 6,532,498 B1 | * | 3/2003 | Hager et al. ................ 719/318 |
| 6,535,929 B1 | * | 3/2003 | Provino et al. .............. 719/321 |
| 6,542,734 B1 | * | 4/2003 | Abrol et al. .............. 455/412.1 |
| 6,804,818 B1 | * | 10/2004 | Codella et al. .............. 719/315 |
| 7,020,697 B1 | * | 3/2006 | Goodman et al. .......... 709/223 |
| 7,047,532 B1 | * | 5/2006 | Connelly .................... 719/310 |
| 7,143,186 B2 | * | 11/2006 | Stewart et al. .............. 709/245 |
| 2001/0015654 A1 | | 8/2001 | Habersetzer et al. |
| 2002/0029378 A1 | | 3/2002 | Larsson |
| 2002/0054587 A1 | * | 5/2002 | Baker et al. ................. 370/352 |
| 2002/0069065 A1 | | 6/2002 | Schmid et al. |
| 2003/0037174 A1 | * | 2/2003 | Lavin et al. ................. 709/313 |
| 2005/0114517 A1 | * | 5/2005 | Maffeis ...................... 709/227 |

FOREIGN PATENT DOCUMENTS

| | | |
|---|---|---|
| EP | 1074911 A2 | 2/2001 |
| EP | 1 136 912 A2 | 9/2001 |
| EP | 1241905 A1 | 9/2002 |
| WO | WO 97/16938 | 5/1997 |
| WO | WO 98/19239 | 5/1998 |
| WO | WO 99/49394 | 9/1999 |
| WO | WO 00/08611 | 2/2000 |
| WO | WO 00/69084 | 11/2000 |
| WO | WO 00/72586 A2 | 11/2000 |
| WO | WO 01/14960 A2 | 3/2001 |
| WO | WO 01/41393 A2 | 6/2001 |
| WO | WO 01/50282 A1 | 7/2001 |
| WO | WO 01/51940 A1 | 7/2001 |
| WO | WO 01/88707 A2 | 11/2001 |
| WO | WO 02/27565 | 4/2002 |
| WO | WO 02/29824 | 4/2002 |
| WO | WO 02/33879 A2 | 4/2002 |
| WO | WO 02/35351 A1 | 5/2002 |
| WO | WO 02/054094 | 7/2002 |

OTHER PUBLICATIONS

N.J. Drew et al., "Reconfigurable Mobile Communications: Compelling Needs and Technologies to Support Reconfigurable Terminals", IEEE International Symposium on Personal, Indoor and Mobile Radio Communications, PIMRC. Wireless: Merging onto the Information Superhighway, vol. 1, Sep. 18, 2000 (pp. 484-489).

Aspects & Crosscutting in Layered Middleware Systems by Lodewiik M.J. Bergmans et al.; Trese Group-Center for Telematics and Information Technology (CTIT); pp. 1-3.

Supporting the Design of Adaptable Operating Systems Using Aspect-Oriented Frameworks by Paniti Netinant et al.; International Conference on Parallel and Distributed Processing Techniques and Applications (PDPTA 2000); Las Vegas, Nevada; Jun. 26-29, 2000; 7 Pages.

U.S. Appl. No. 10/359,911.
U.S. Appl. No. 10/359,772.
U.S. Appl. No. 10/359,835.
U.S. Appl. No. 10/666,673.
U.S. Appl. No. 10/664,618.
U.S. Appl. No. 10/665,834.

A Layered Approach to Building Open Aspect-Oriented Systems by Paniti netinant et al.; Communications of the AC; Oct. 2001; vol. 44, No. 10; pp. 83-85.

Aspect-Oriented Programming by Silvia Breu; pp. 1-22.

Draft: Aspect-Design in the Building-Block Method by Jurgen K. Muller; Philips Research Laboratories; International Workshop on Aspect-Oriented Programming at ECOOP, 1992; 3 Pages.

A Version Model for Aspect Dependency Management by Elke Pulvermuller et al.; J. Bosh (Ed.): GCSE 2001, LNCS 2186, Springer-Verlag Berlin Heidelberg 2001, pp. 70-79.

Can AOP Support Extensibility in Client-Serer Architectures? by Yvonne Coady et al.; European Conference on Object-Oriented Programming (ECOOP); Aspect-Oriented Workshop, Jun. 2001; pp. 1-4.

Mapping Requirements to Architecture: an Experience Report from the VIVIAN Project by Titos Saridakis; Proceedings of the 14th International Conference on Software and Systems Engineering and their Applications, Dec. 2001, pp. 1-6.

Functionality Needed in Middleware for Future Mobile Computing Platforms by Kimmo Raatikainen; Middleware for Mobile Computing Workshop held at IFIP/ACM Middleware Conference, Heidelberg, Germany, 2001; 10 Pages.

Design and Implementation of Java Application Environment and Software Platform for Mobile Phones, by Kazutoshi Usui, Hiroyuki Tomimori, Junji Takagi, Tomohisa Tanaka and Yukikazu Nakamoto; XP-001092568; Special Issue on IMT2000 Mobile Communication System; Oct. 2001; pp. 379-383.

Container-Managed Messaging: An Architecture for Integrating Java Components and Message-Oriented Applications by Ignacio Silva-Lepe, Christopher Codella, Peter Niblett, Donald Ferguson, Proceedings of the 37th International Conference on Technology of Object-Oriented Languages and Systems (Tools-Pacific 2000), Sydney, NSW, Australia, Nov. 20-23, 2000; pp. 228-241.

K. Moessner, et al., "Terminal Reconfigureability-The Optima Framework" 3G Mobile Communication Technologies, No. 477, XP002266662, Mar. 26-28, 2001, (pp. 241-246).

K. Moessner, et al., "Terminal Reconfigureability-The Software Download Aspect", 3G Mobile Communication Technologies, Conference Publication, No. 471, XP002266663, (pp. 326-330).

U.S. Appl. No. 10/606,684.

Don Batory et al., "The Design and Implementation of Hierarchical Software Systems with Reusable Components" ACM Transactions on Software Engineering and Methodology, Association for Computing Machinery, New York, US, vol. 1, No. 4, Oct. 1, 1992, pp. 355-398.

Gabriele Goldacker et al., "Broadband-ISDN standardization—State of the art", Computer Standards and Interfaces, Elsevier Sequoia. Lausanne, CH, vol. 17, No. 1, 1995, pp. 55-62.

* cited by examiner

MIDDLEWARE APPLICATION MESSAGE/EVENT MODEL

RELATED APPLICATIONS

This application claims priority from and incorporates by reference the entire disclosure of U.S. Provisional Patent Application Ser. No. 60/412,901, filed on Sep. 23, 2002. This application claims priority from and incorporates by reference the entire disclosure of U.S. Provisional Patent Application Ser. No. 60/412,902, filed on Sep. 23, 2002. This application claims priority from and incorporates by reference the entire disclosure of U.S. Provisional Patent Application Ser. No. 60/412,769, filed on Sep. 23, 2002. This application claims priority from and incorporates by reference the entire disclosure of U.S. Provisional Patent Application Ser. No. 60/412,756, filed on Sep. 23, 2002. This patent application incorporates by reference the entire disclosure of U.S. patent application Ser. No. 10/359,772, which was filed on Feb. 7, 2003, now is Pat. No. 7,415,270. This patent application incorporates by reference the entire disclosure of U.S. patent application Ser. No. 10/359,835, which was filed on Feb. 7, 2003. This patent application incorporates by reference the entire disclosure of U.S. patent application Ser. No. 10/359,911, which was filed on Feb. 7, 2003.

BACKGROUND OF THE INVENTION

1. Technical Field of the Invention

The present invention relates generally to the field of wireless telecommunications and, more particularly, to a system and method for transmitting and receiving messages between first and second software components, such as, for example, application software and a software services component of a platform in a mobile terminal for a wireless telecommunications system.

2. Description of Related Art

Since cellular telecommunications systems were first introduced in the 1980s, mobile terminals (Mobile Stations) utilized in the systems have become increasingly more complex. Initially, mobile terminals were designed primarily to provide voice telephony services; i.e., to receive and transmit voice communications. In later years, mobile terminals were developed that also included the ability to transfer user data not related to that of a voice telephone call. Such user data included, for example, data to be transferred over a dial-up networking connection initiated via a personal computer (PC).

Currently, so-called "third generation" (3G) systems are being developed for future mobile telecommunications systems. 3G systems will combine high-speed Internet access with traditional voice communication, and will provide a user with access to Internet browsing, streaming audio/video, positioning, video conferencing and many other capabilities in addition to voice communication.

The Third Generation Partnership Project (3GPP) was established to ensure compatibility among the several 3G systems that are being developed around the world. The Universal Mobile Telephone System (UMTS) is being developed by 3GPP to provide a 3G system that includes terrestrial and satellite systems capable of delivering voice, data and multimedia anywhere in the world.

The drastically increased functionality that is being included in cellular telecommunications systems via the 3GPP standardization has placed substantial demands on the developers of mobile terminals to be used in the systems. This demand is exacerbated by the fact that a mobile terminal is a "resource scarce" environment that is limited in size, memory and power.

Traditionally, mobile terminal manufacturers have designed, fabricated and marketed substantially complete mobile terminal systems that include all the hardware and software needed for basic terminal operation as well as the hardware and software needed to provide the features and capabilities desired by the manufacturer or a particular user based on their perception of market needs. Such an approach does not provide the flexibility to quickly adapt to rapid changes in market demands or to satisfy the diverse requirements of multiple stakeholders.

Recognizing the inadequacies of traditional procedures for designing and fabricating mobile terminals, a mobile terminal platform assembly has been developed that includes a plurality of functionally complementary units of software and hardware that can be marketed as a unit to a plurality of users. Each user can then install, load, and run his own application software into the assembly to provide a tailored platform system for a mobile terminal that meets the user's own particular needs. The mobile terminal platform assembly and the platform system are described in detail in commonly assigned U.S. patent application Ser. Nos. 10/359,911 and 10/359,835, the disclosures of which are hereby incorporated by reference.

A platform system such as described above, wherein mobile terminal platform assembly software and application software are developed separately and then later combined by installing, loading, and running the application software in the mobile terminal platform assembly, requires that result messages originating from a service request, which may also include delivery of event information, be transmitted from software in the platform assembly to an application via an interface in the platform assembly. Such messages may be transmitted using either a stack/procedure-based approach (i.e., callback mode), or a serial-based approach (i.e., full message mode).

The callback mode is a simple and well-proven technique that allows an application to focus on application specific functionality and leave basic and complex mechanism-related handling to the platform or framework. The software developer has the possibility to route messages directly to a handler of the result (function/procedure/method). For example, the developer/user may initiate a user interface application where, e.g., a Window Manager passes messages holding information of the user interaction events or messages to well-defined handlers. The invocation of the user code is completely determined by the Window Manager. The value-added functionality is accessible or available to the developer, whereas the message loop and the freeing of messages are not viewable to the user. Thus, the developer is not required to route the different messages to dedicated parts of the program and the developer cannot degrade the system. Therefore, in callback mode, the application code has no control in terms of when, and in what order, to process a certain message. In some circumstances, the application may need to control the order in which messages are processed, or the time at which a specific message is processed (i.e., priority handling).

Accordingly, another technique, denoted the full message mode, may be utilized as an alternative to the callback mode. The full message mode queues messages at, for example, an application thread. The queued messages then await processing by the application. The queued messages may be processed in an ordered manner, such as in a FIFO technique, or the queued messages may be processed in parallel or in a prioritized manner. In this case, the application code has complete control of the message loop.

Current solutions, such as those incorporated into PalmOS and Brew environments, allow a user to use either the callback mode or the full message mode, but the user or application software is not free to choose the mode in which to receive incoming messages. The callback or full message mode is predetermined for the application.

There is, accordingly, a need for a message model that offers the user (application software) the choice of receiving messages either via the callback mode or the full message mode. The user may choose which message mode best suits the problem individually at each different instance.

SUMMARY OF THE INVENTION

In an embodiment of the invention, a system for transmitting messages between a platform domain and an application domain for a product includes a platform domain having a software component and an interface component. The interface component has at least one interface for providing an application or a module in the application domain with access to the software component, and a message transmitting mechanism for transmitting messages between the platform domain and the application domain via the interface. The message transmitting mechanism includes a message model for allowing an application or another module in the application domain to select or switch between either a callback mode or a full message mode for receiving messages from the platform domain. The message transmitting model also includes a message handler for routing messaging according to the selected mode.

In another embodiment of the invention, a platform domain has a software component and an interface component having at least one interface for providing an application or a module in an application domain with access to the software component. A method of transmitting messages between an application domain and a platform domain includes the application or the module in the application domain selecting either a callback mode or a full message mode or switching between the callback mode and the full message mode. The modes are for receiving messages from the platform domain. A message handler routes messaging according to the selected mode.

A message transmitting mechanism for transmitting messages between first and second software components includes a message model for allowing one of the first and second software components to select either a callback mode or a full message mode or switch between the callback mode and the full message mode, the modes being for receiving messages between the first and second software components. The mechanism also includes a message handler for routing messaging according to the selected mode.

Further advantages and specific details of the present invention will become apparent hereinafter from the detailed description given below in conjunction with the following drawings.

DETAILED DESCRIPTION OF THE EXEMPLARY EMBODIMENTS OF THE INVENTION

Figure 1:
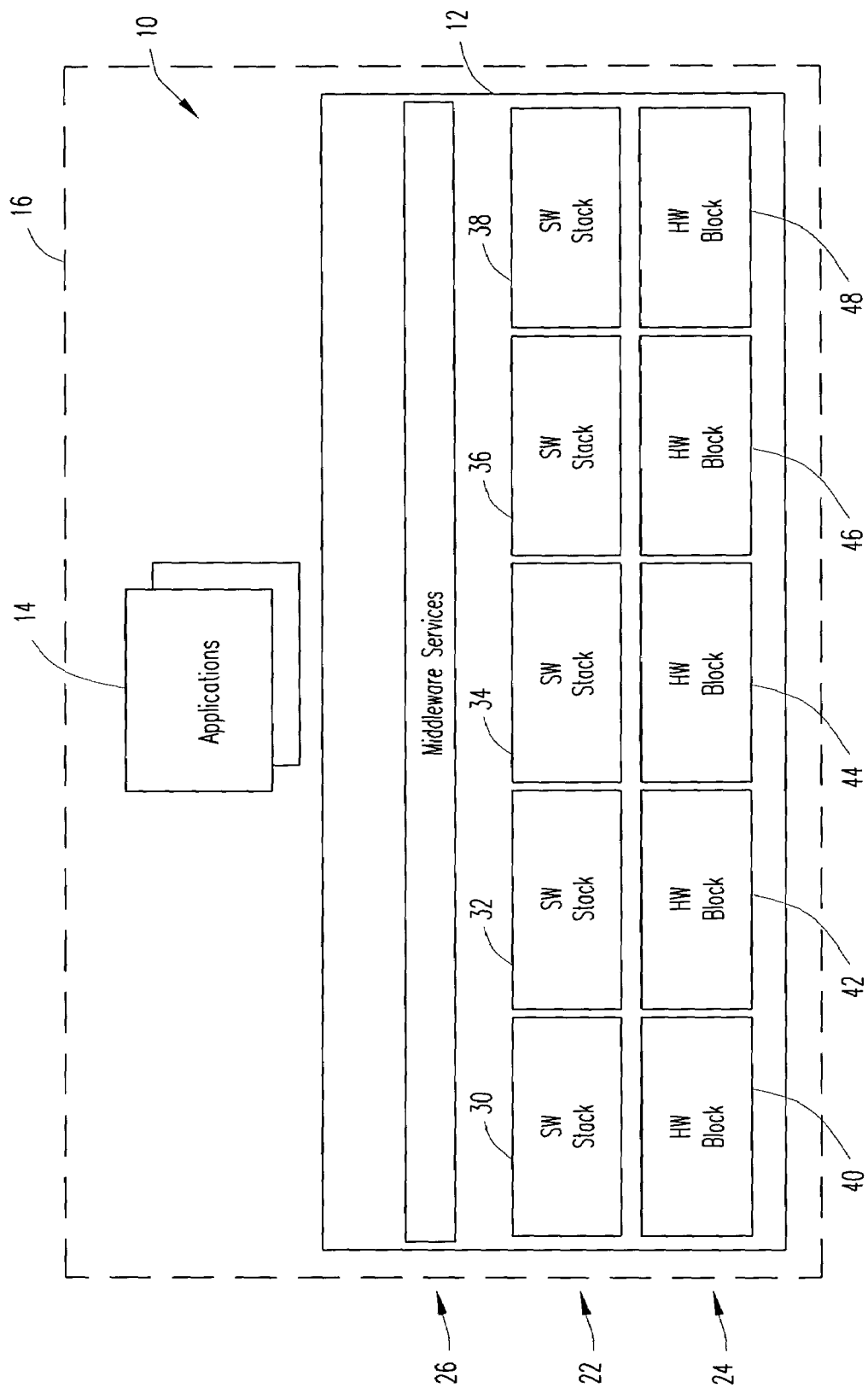
FIG. 1 is a block diagram that schematically illustrates a platform system for a mobile terminal for a wireless telecommunications system to assist in explaining principles of the present invention.

FIG. 1 is a block diagram that schematically illustrates a platform system for a mobile terminal for a wireless telecommunications system to assist in explaining principles of the present invention. The platform system is generally designated by reference number 10 and includes a mobile terminal platform assembly 12 and one or more applications (i.e., application software) 14 that have been installed, loaded and run in the mobile terminal platform assembly. Platform system 10 is adapted to be incorporated in a mobile terminal generally designated by dotted line 16.

Mobile terminal platform assembly 12 includes a software services component 22, a hardware component 24 and an interface component 26. Software services component 22 includes a plurality of well-structured functional software units for providing services that are offered to users via the interface component 26. Users include platform users (e.g., phone manufacturers) and end users (e.g., telephone users). In the exemplary system illustrated in FIG. 1, the plurality of software units include a plurality of vertically-oriented functional software stacks 30-38.

The hardware component 24 includes a set of hardware units that are associated with and controlled by their respective functional software stacks. In the exemplary system illustrated in FIG. 1, the hardware units are different hardware blocks 40-48 associated with the software stacks 30-38.

The interface component 26 includes a middleware services layer that includes at least one application programming interface (API) for installing, loading and running one or more applications 14 in mobile terminal platform assembly 12 that isolates the mobile terminal platform assembly 12 from the applications using the mobile terminal platform assembly 12 and provides various other services for the applications 14. Specific details of the middleware services layer will be described hereinafter.

Mobile terminal platform assembly 12, at a later time in order to expand the functionality of platform system 10, is adapted to be designed, implemented (assembled) and tested as a complete, enclosed unit separate from the application software 14 (the term "application software" as used herein can be any software that provides the functionality that users may wish to have available). Mobile terminal manufacturers and other parties with development capacity can, accordingly, develop or otherwise acquire their own application software and add that software to the mobile terminal platform assembly 12 at a later time in order to tailor the platform system 10.

Mobile terminal platform assembly 12 can, accordingly, be sold or otherwise transferred to a plurality of different users each of which can tailor the platform system 10 by installing, loading and running their own application software in the assembly in order to satisfy their own particular requirements for the platform system.

Figure 2:
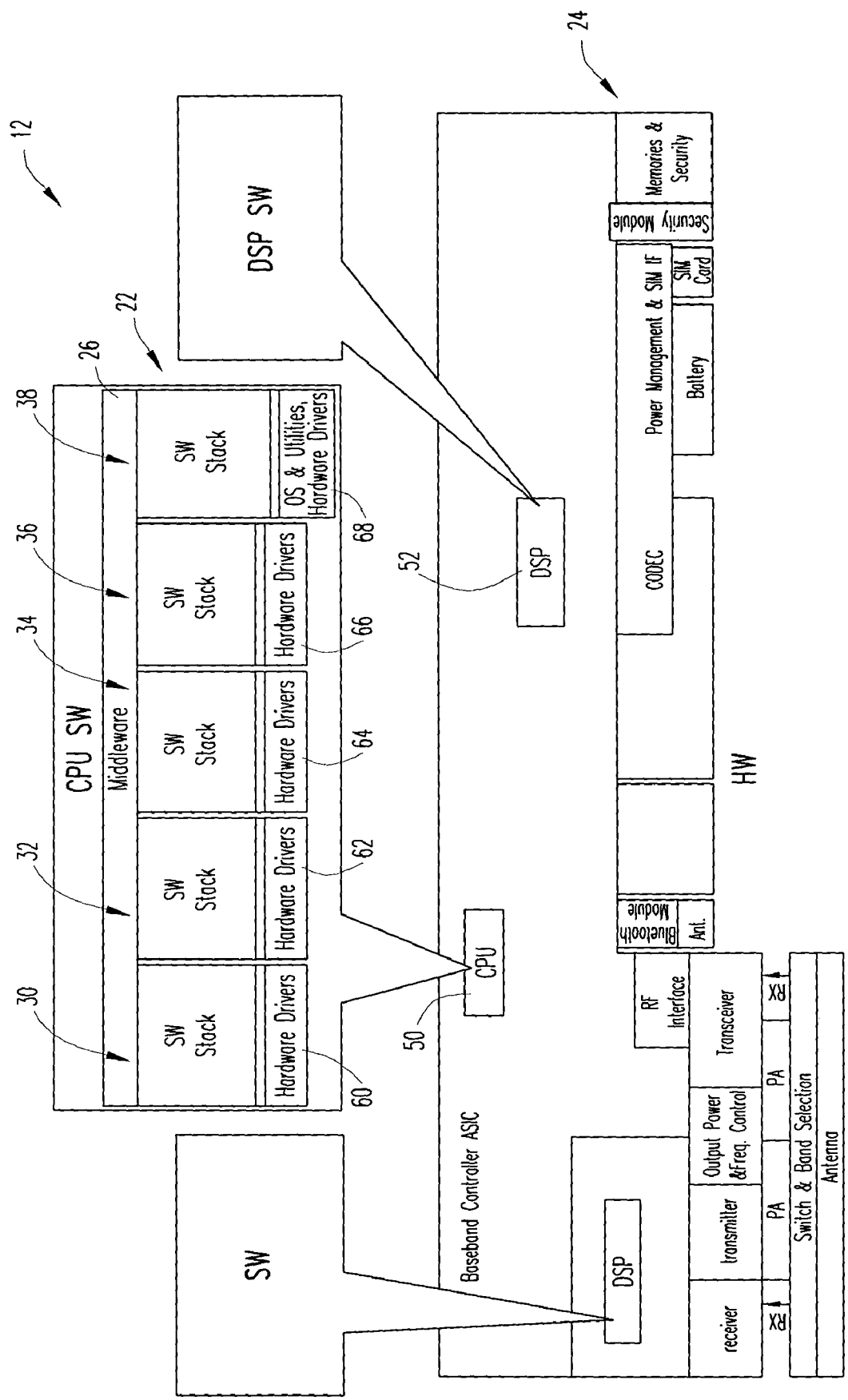
FIG. 2 is a block diagram that schematically illustrates a deployment view of the mobile terminal platform assembly of the platform system of FIG. 1 to further assist in explaining principles of the present invention.

FIG. 2 is a block diagram that schematically illustrates one example of a deployment view of mobile terminal platform system 12 of FIG. 1 to further assist in understanding principles of the present invention. As illustrated in FIG. 2, mobile terminal platform assembly 12 is controlled via software executing in a main CPU 50. The main CPU 50 may include one or more processors such as microprocessors, micro programmable processors or DSPs (Digital Signal Processors) 52. The software stacks 30-38 of software services component 22 each include hardware driver software 60-68 to operate the hardware units associated with each stack. Further details of the mobile terminal platform assembly 12 and platform system 10 are given in the above-mentioned commonly-assigned U.S. patent application Ser. No. 10/359,835.

Figure 3:
FIG. 3 is a block diagram that schematically illustrates the software architecture of the mobile terminal platform assembly of FIGS. 1 and 2 to further assist in explaining principles of the present invention.

The software incorporated in mobile terminal platform assembly 12 is preferably arranged in such a manner as to make the software organization easy to understand so that it can be more easily designed and more easily upgraded or otherwise modified. FIG. 3 is a block diagram that schematically illustrates the software architecture of mobile terminal platform assembly 12 to further assist in explaining principles of the present invention.

As shown in FIG. 3, software services component 22, in addition to being organized into a plurality of vertical, functional software stacks as described above, is also arranged to define a plurality of horizontal layers such that the software of the middleware services layer and the software of the software services component 22 together define a layered architecture, generally designated by reference number 70, in which the layers are arranged in descending order from a higher level service layer to a lower level service layer.

The software architecture differs from the standard ISO/OSI (ISO Open Systems Interconnection) model in that it includes a plurality of horizontally partitioned functional software units that complement a plurality of vertically partitioned software layers. The horizontal partitioning contributes significantly to the creation of independent modular (service) components.

The highest layer of the layered architecture is the middleware services layer. The layers of the software services component 22 include an application server layer 80 to provide application services, a platform services layer 82 to provide platform specific services for applications, a platform protocol layer 84 to provide session protocols and application specific protocols, a transport layer 86 to provide audio access/control, datacom transport protocols, messaging transport protocols and the like, a data access layer 88 to provide external data IF access, structured storage services and other low level platform support services, a logical drivers layer 90 and a physical drivers layer 92 encapsulating hardware dependencies. In addition, software services component 22 includes basic system services layers 94 that provide general services that are needed by the platform assembly.

The bottom two layers 90 and 92 constitute Hardware Abstraction Layers (HAL) which isolate the dependencies between the software and the hardware. Only the physical drivers layer is concerned with the details of the hardware (i.e., which registers in the ASIC hardware are addressed). The logical drivers layer 90 provides a logical mapping to the hardware, i.e., this layer provides a bridge between the hardware and software parts of the mobile terminal platform assembly 12.

The software itself is organized into a plurality of software modules, modules 102, 104, and 106 being specifically indicated in FIG. 3. In software services component 22, a single module can reside in only one vertical functional stack and in only one horizontal layer within that stack. Each layer can contain from one to many modules, and all the modules in a particular layer in a particular stack have the same level of abstraction. Communication among the various modules is accomplished via a Software Back Plane (SwBP) 112 subject to a set of basic rules for software module-to-module access. These rules can be summarized as follows:

A software module may invoke functionality in all layer interfaces below its own layer.

There are no limitations for the direction of serialized data flows. They may go in any direction.

A software module may never invoke functionality in layer interfaces (in the SwBP 112) above its own layer, independent of to which module the layers belong.

A software module may invoke functionality in the layer interface in its own layer in the same vertical stack.

A software module may invoke functionality in a software module in the same layer in another vertical stack. (This capability is permitted to limit the number of layers in the vertical stacks.)

There is no hard coupling between the various modules and the interfaces in the SwBP 112. As a result, the modules and/or the implementation of the interfaces can be freely changed without any impact on the clients to the interfaces. This is an important capability as it permits individual modules to be added, removed or changed without affecting other modules in the platform assembly.

Further details of the layered architecture, including the SwBP software structure that enables the internal communication between modules within the mobile terminal platform assembly are described in the above-mentioned commonly assigned U.S. patent application Ser. No. 10/359,911.

The middleware services layer functions to provide a well-defined interface between the software in the mobile terminal platform assembly 12 and the application software 14 to be installed, loaded, and run in the platform assembly. In addition, the middleware services layer encapsulates the mobile terminal platform assembly 12, isolates the assembly from applications 14 via the middleware services layer, and provides various other services for the applications 14.

Figure 4:
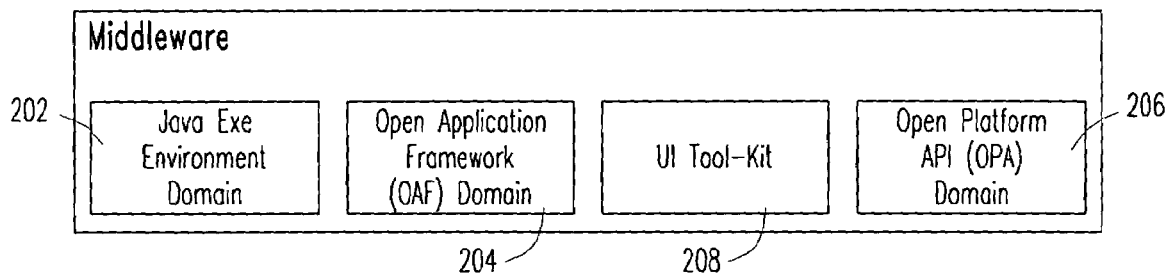
FIG. 4 is a block diagram that schematically illustrates details of the middleware services layer of FIGS. 1-3 to further assist in explaining principles of the present invention.

FIG. 4 is a block diagram that schematically illustrates details of middleware services layer. As shown in FIG. 4, the middleware services layer includes a plurality of API domains including non-native environments e.g. the Java Execution (Java ExE) Environment API domain 202, Open Application Framework (OAF) API domain 204, Open Platform API (OPA) domain 206 and UI Tool-kit API domain 208.

Through the APIs in the middleware services layer, the mobile terminal platform assembly 12 supports a plurality of application environments. In FIG. 4, middleware services layer supports environments for native applications (i.e., applications that are compiled to run with a particular processor and its set of instructions) and for non-native applications such as, for example, Java J2ME CLDC/MIDP (Java 2 Micro Edition Connected Limited Device Configuration/Mobile Information Device Profile) applications. Each application environment has its own characteristics and is defined as:

The way applications are developed (programming language support, compilation and linkage).

The way applications are executed (e.g., interpretation or native code execution)

The functional services that are offered.

Potential restrictions in use.

By providing multiple application environment alternatives, a wide range of products with varying demands such as cost, ease of use, time to market, functionality set, size, portability, etc. is facilitated.

Further details of the middleware services layer are described in commonly assigned, U.S. patent application Ser. No. 10/359,772, the disclosure of which is hereby incorporated by reference.

Figure 5:
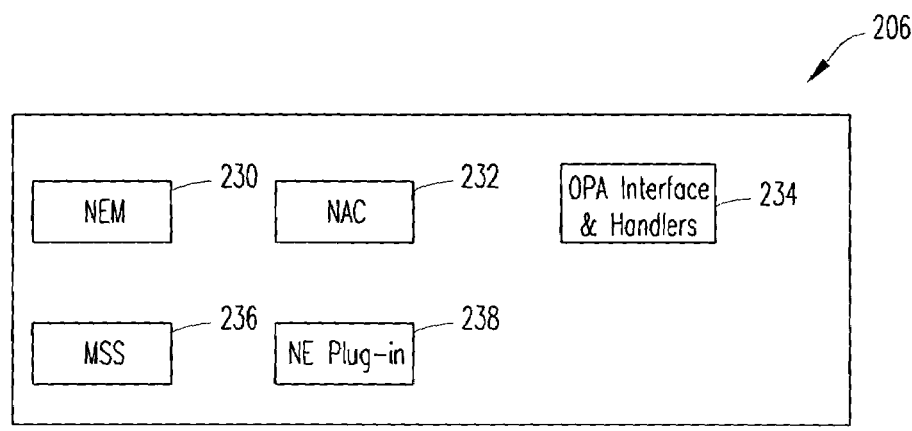
FIG. 5 is a block diagram that schematically illustrates details of the OPA domain of the middleware services layer of FIG. 4 in accordance with principles of the present invention.

FIG. 5 is a block diagram that schematically illustrates the major software modules of the Open Platform (OPA) domain 206 in accordance with principles of the present invention. As illustrated, the OPA domain 206 includes five modules: a Native Environment Management (NEM) module 230; a Native Application Core (NAC) module 232; an OPA Interface and Handlers module 234; a Middleware Support Services module 236; and a Native Extension Plug-in module(s) 238. The Native Environment Management module 230 has the responsibility of controlling native applications in platform system 10 and is the recipient of the control commands concerning native applications from an Application Manager and keeps track of native applications that are currently running in the system. The Middleware Support Services module 236 provides services to the OPA domain 206 that are common for the different handlers or that need to be centralized such as, for example, object management and resource supervision.

The Native Extension Plug-in module(s) 238 can be seen as an optional extension of the platform assembly functionality through the OPA Interface and Handlers module 234. The NE plug-in module(s) 238 are subject to the same interface guidelines, paradigms and mechanisms that rule and apply to the OPA Interface and Handlers module 234. The OPA Native Extension Plug-in module(s) 238 access the platform functionality through the OPA Interface and Handlers module 234.

The Native Application Core module 232 administers and takes care of the threading and message handling complexities that the applications would otherwise have to handle themselves. It also serves the purpose of achieving OS independence by hiding the implementation details of the OS for relieving applications from run-time complexities including message routing/filtering and message-related resource handling. A major responsibility of the Native Application Core module 232 is to hide the details of the start-up and shutdown phase of an application 14 and in the handling of messages.

Figure 6:
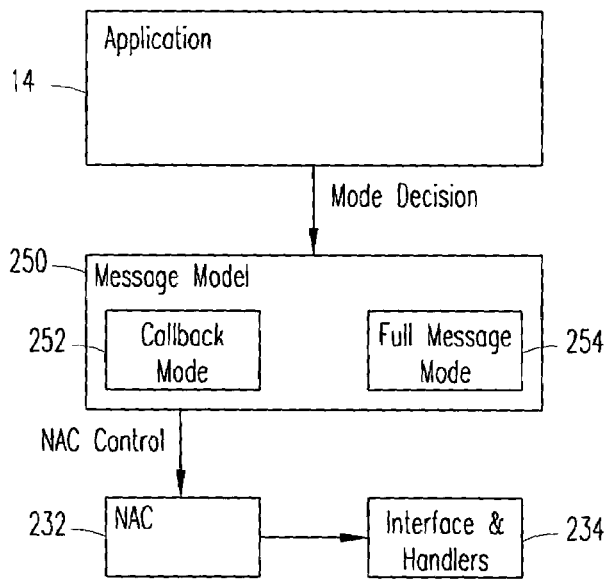
FIG. 6 is a block diagram that schematically illustrates the signaling and the components utilized in controlling full message mode or callback mode in accordance with principles of the present invention.

FIG. 6 illustrates the components and signaling involved in an application 14 utilizing either the callback mode or the fall message mode for receiving messages from the software services component 22 of the platform assembly 12 via middleware services layer, in accordance with principles of the invention. A message model 250 allows an application 14 to choose between callback mode 252 or full message mode 254 dependent on what is most beneficial for the current operations and situation of the application 14. Once application 14 has entered the desired mode, the message model 250 initiates the signaling conventions associated with the chosen mode, namely callback mode 252 or full message mode 254. The NAC module 232 is aware of the chosen mode and handles the messages according to the requisite signaling convention.

If the application 14 chooses to enter the callback mode 252, NAC module 232 directs messages to the appropriate handler in the OPA Interface and Handlers module 234, which then formats messages according to the callback mode.

In callback mode 252, the software developer has the possibility to receive the result directly in a function/procedure/method, such as a general function or a dedicated function. The callback mode 252 is entered when the application 14 returns execution control to the middleware services layer after the execution of a callback. Once the application 14 returns control to the middleware services layer, it is possible to trigger other callback functions. However, during execution of a callback function, other messages may be processed by the application 14 by using the full message mode 254.

If the application 14 chooses to enter the full message mode 254, NAC module 232 directs messages to the appropriate application message queue according to the full message mode 254. The software developer now has complete control of the message loop. The full message mode 254 is the default mode and is active when the application 14 is in control of its own thread. In this case the application 14 might choose to poll the message queue via an explicit request to the middleware services layer at any time. Several options are available for receiving messages in full message mode 254. For example, the user or the software developer may choose to request that the calling thread is blocked, optionally with timeout, until a message is available or check for messages without blocking the thread. Also, a filter parameter may be used, thereby making it possible to respond to messages in a certain order, filtering out less important ones for later processing. In full message mode 254, the application code is responsible for freeing a message. The application 14 may thus in certain situations choose to forward a received message to another application 14, without the need to free and allocate the message again, which improves performance.

When switching to callback mode 252 from full message mode 254, the software developer allows software of the middleware services layer to invoke the proper callback functions. In addition, application 14 may change between callback mode 252 and full message mode 254 at any time, even in real time. Therefore, the application 14 has the ability to choose at any time the message reception mode best suited to each individual problem. The callback mode 252 and the full message mode 254 may co-exist in any combination of software entities in the application software domain.

Figure 7:
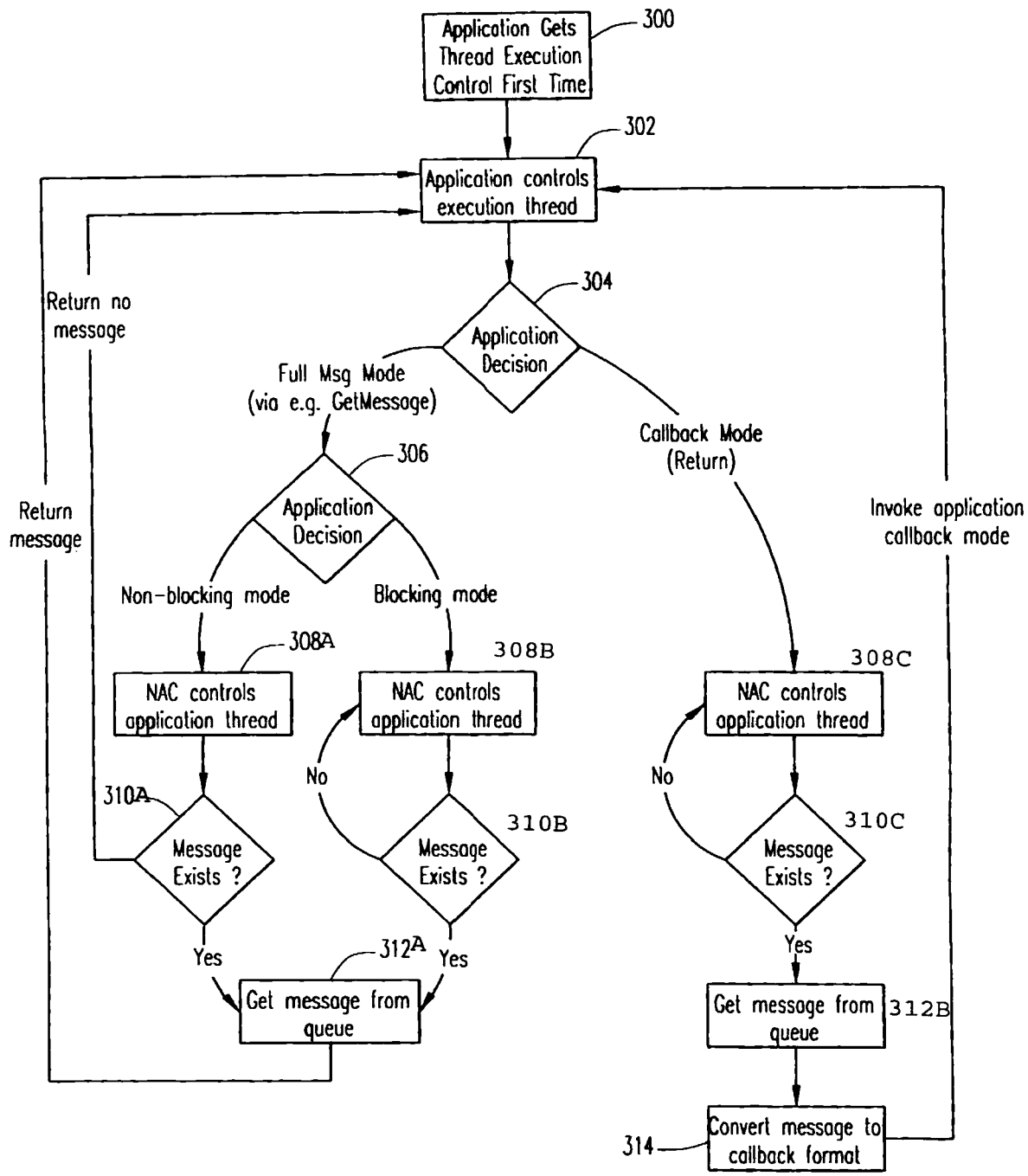
FIG. 7 is a flow diagram that illustrates invoking of full message mode or callback mode in accordance with principles of the present invention.

FIG. 7 is a flow diagram that illustrates invoking of full message mode or callback mode in accordance with principles of the present invention. At step 300, an application 14 gets control over its main thread for the first time since startup of the system. The application 14 will retain this control, indicated by step 302, until the application 14 decides to wait for a message from the middleware services layer. The application 14 will then make a decision 304 whether to wait for the message in callback mode or full message mode. If the decision is callback mode, the application 14 will execute a return statement, which transfers the control of the application thread to the NAC module 232, indicated by 308C. The NAC module 232 will then poll the message queue of this thread for existing messages indicated by 310C. The NAC module 232 will keep polling the queue until a message is found, upon which it will get the message from the queue 312B, convert the message to a callback format 314 and invoke a callback method previously specified by the application 14 in order to handle the message. This completes the loop and the application 14 may again make a decision indicated by 304 as to whether the application 14 will enter callback or full message mode.

If full message mode is chosen, the application 14 has to decide whether to enter in blocking or non-blocking mode, as indicated by 306. The application 14 will do so by requesting a message from the OPA Interface and Handlers module 234 in the middleware services layer. The type of request will also indicate whether the request should be non-blocking or blocking. If a non-blocking request is issued, the request transfers the control of the application thread to the NAC module 232, indicated by 308A. The NAC module 232 will then poll the message queue of this thread for the existence of a message according to the specification of the request. If a matching message is found in step 310A, then this message will be removed from the message queue (indicated by 312A) and returned to the application 14. If no message is found, the NAC module 232 will return the control of the thread to the application 14 without passing any message. This completes the loop and the application 14 may again make a decision indicated by 304 as to whether the application 14 will enter callback or full message mode.

If full message mode is chosen, the application 14 again has to decide whether to 15 enter in blocking or non-blocking mode, as indicated by 306. As previously described for non-blocking mode, the application 14 will do so by requesting a message from the OPA Interface and Handlers module 234 in the middleware services layer. The type of request will again indicate whether the request should be non-blocking or blocking. If a blocking request is issued, the request transfers the control of the application 14 thread to the NAC, indicated by 308B. The NAC module 232 will then poll the message queue of this thread for the existence of a message according to the specification of the request. If no message is found, the NAC module 232 will continue to poll the message queue for the requested message(s) until one is found or a potential specified timeout period is exceeded. As soon as a matching message is found in step 310B, then this message will be removed from the message queue (indicated by 312A) and returned to the application 14. This completes the loop and the application 14 may again make a decision indicated by 304 as to whether it will enter callback or full message mode.

While what has been described constitute exemplary embodiments of the invention, it should be understood that the invention can be varied in many ways without departing from the scope thereof For example, although the present invention has been described primarily in connection with the transmission of messages in a particular platform system for a mobile terminal for a wireless telecommunications system, the invention can also be used in connection with the transmission of messages in other platforms for mobile terminals, and in platforms for other products. Because the invention can be varied in many ways, it should be recognized that the invention should be limited only insofar as is required by the scope of the following claims.

We claim:

1. A computer system having computer hardware having a memory and processor and computer software loadable into the memory and executable by the computer hardware, said computer software comprising code for transmitting messages between a platform domain and an application domain for a product, the computer system comprising:
    a platform domain having a software component and an interface component, the interface component having at least one interface for providing an application or a module in the application domain with access to the software component, and a message transmitting mechanism for transmitting messages between the platform domain and the application domain via the interface;
    the message transmitting mechanism including:
        a message model for allowing an application or another module in the application domain to select or switch between either a callback mode or a full message mode for receiving messages from the platform domain, wherein the application or the module in the application domain may change or switch between the callback mode and the full message mode at any time; and
        a message handler for routing messaging according to the selected mode.

2. The computer system according to claim 1, wherein the message handler is included in the platform domain.

3. The computer system according to claim 2, wherein: the interface comprises a middleware services layer; and the message handler comprises a Native Application Core module that acts as a router included in the middleware services layer.

4. The computer system according to claim 3, wherein the Native Application Core module is included in an Open Platform API (OPA) domain of the middleware services layer.

5. The computer system according to claim 1, wherein support for the message model is included in the platform domain and controlled by the modules in the application domain.

6. The computer system according to claim 1, wherein, if the callback mode is selected, the callback mode is entered by the application returning execution control to the message handler after the invocation of a callback function/procedure/method.

7. The computer system according to claim 1, wherein if the full message mode is selected, the full message mode is entered by the application keeping the execution control after the invocation of a callback function/procedure/method and polling the message handler for queued messages.

8. The computer system according to claim 1, wherein the platform domain comprises a platform for a mobile terminal for a wireless telecommunications system.

9. A method executing within a computer having a processor, of transmitting messages between an application domain and a platform domain, the platform domain having a software component and an interface component having at least one interface for providing an application or a module in the application domain with access to the software component, the method comprising the steps of:
    the application or the module in the application domain selecting either a callback mode or a full message mode or switching between the callback mode and the full message mode at any time, the callback mode and the full message mode being for receiving messages from the platform domain and a message handler routing messaging according to the selected mode.

10. The method according to claim 9, wherein, if the callback mode is selected, the method further includes the step of entering the callback mode by the application returning execution control to the message handler after the invocation of a callback function/procedure/method.

11. The method according to claim 9, wherein if the full message mode is selected, the method further includes the step of entering the full message mode by the application keeping the execution control after the invocation of a callback function/procedure/method and polling the message handler for queued messages.

12. The method according to claim 9, wherein the platform domain comprises a platform for a mobile terminal for a wireless telecommunications system.

13. A message transmitting mechanism of a computer having computer hardware with a memory and processor and computer software loadable into the memory and executable by the computer hardware, said computer software comprising code for transmitting messages between first and second software components, the message transmitting mechanism comprising:

a message model for allowing one of the first and second software components to select either a callback mode or a full message mode or switch between the callback mode and the full message mode, the callback mode and the full message mode being for receiving messages between the first and second software components, wherein the application may switch between the callback mode and the full message mode at any time; and a message handler for routing messaging according to the selected mode.

14. The mechanism according to claim 13, wherein the second software component is in a platform domain that includes an interface component comprising an interface for providing the first software component with access to the second software component, and wherein the message handler is included in the interface component.

15. The mechanism according to claim 14, wherein: the interface component comprises a middleware services layer; the message handler comprises a Native Application Core module included in the middleware services layer; and the Native Application Core module is adapted to act as a router.

16. The mechanism according to claim 15, wherein the Native Application Core module is included in an Open Platform API (OPA) domain of the middleware services layer.

17. The mechanism according to claim 13, wherein support for the message model is included in the platform domain and controlled by the modules in the application domain.

18. The mechanism according to claim 13, wherein, if the callback mode is selected, the callback mode is entered by the application returning execution control to the message handler after the invocation of a callback function/procedure/method.

19. The mechanism according to claim 13, wherein if the full message mode is selected, the full message mode is entered by the application keeping the execution control after the invocation of a callback function/procedure/method and polling the message handler for queued messages.

20. The mechanism according to claim 14, wherein the platform domain comprises a platform for a mobile terminal for a wireless telecommunications system.

* * * * *

UNITED STATES PATENT AND TRADEMARK OFFICE
CERTIFICATE OF CORRECTION

PATENT NO. : 7,478,395 B2  Page 1 of 1
APPLICATION NO. : 10/666699
DATED : January 13, 2009
INVENTOR(S) : Bjare et al.

It is certified that error appears in the above-identified patent and that said Letters Patent is hereby corrected as shown below:

On the Title Pg, Item (74), under "Attorney, Agent, or Firm", delete "MIchael" and insert -- Michael --, therefor.

In Column 7, Line 2, delete "execution)" and insert -- execution). --, therefor.

In Column 7, Line 51, delete "fall" and insert -- full --, therefor.

In Column 9, Line 29, delete "message(s)" and insert -- message(s), --, therefor.

In Column 9, Line 39, delete "thereof" and insert -- thereof. --, therefor.

In Column 10, Line 35, in Claim 9, delete "method" and insert -- method, --, therefor.

Signed and Sealed this

Twentieth Day of October, 2009

David J. Kappos
*Director of the United States Patent and Trademark Office*